United States Patent

[11] 3,625,995

[72] Inventor Donald N. Brattesani
 La Habra, Calif.
[21] Appl. No. 725,941
[22] Filed May 1, 1968
[45] Patented Dec. 7, 1971
[73] Assignee Union Oil Company
 Los Angeles, Calif.

[54] PRODUCTION OF ESTERS OF METHACRYLIC ACID
 11 Claims, No Drawings
[52] U.S. Cl. .................................................. 260/486 AC,
 260/463, 260/479 R, 260/484 R, 260/485 R,
 260/497 A, 260/597 A
[51] Int. Cl. .................................................. C07c 69/54
[50] Field of Search ........................................ 260/486
 AC, 497, 484, 479, 597

[56] References Cited
 UNITED STATES PATENTS
 3,176,038  3/1965  Zachry et al. ................ 260/484 X
 OTHER REFERENCES
 Tsuji, JACS 87 No. 18 Sept. 1965

Primary Examiner—Lewis Gotts
Assistant Examiner—Paul J. Killos
Attorneys—Milton W. Lee, Richard C. Hartman, Lannas S. Henderson, Dean Sandford and Robert E. Strauss ABSTRACT: Esters of methacrylic acid or acrylic acid are produced by the oxidative carbonylation of propylene or ethylene by contacting the olefin, oxygen and carbon monoxide in the presence of an alcohol, a Group VIII noble metal catalyst and, as a cocatalyst, an alkyl, cycloalkyl, aromatic or heterocyclic compound containing an oxide of nitrogen preferably in an aromatic or heterocyclic ring. The oxidation can also be performed in the presence of a redox agent. In a typical embodiment the olefin, carbon monoxide and oxygen are contacted with an alcoholic solution of Group VIII noble metal at a concentration from 0.001 to 1.0 molar, a nitrogen oxide compound, pyridine 1-oxide, at a concentration from 0.01 to 25 weight percent and a redox agent, cupric chloride, at a concentration from 1 to about 35 weight percent. The carbon monoxide partial pressure used is from 10 to about 70 percent of the total pressure which is from 300 to 3,000 p.s.i.g. Under these conditions a substantial portion of the product comprises the desired ester of methacrylic acid.

PRODUCTION OF ESTERS OF METHACRYLIC ACID

DESCRIPTION OF THE INVENTION

Application Ser. No. 375,342 U.S. Pat. No. 3,397,225 discloses the oxidative carbonylation of an olefin in the presence of an alcohol, a Group VIII of noble metal and a redox agent. This process results in the preparation of esters of carboxylic acids such as the esters of acrylate and beta-alkoxy carboxylic acids. When the oxidation is performed on propylene, the substitution of a hydrogen by the alkoxy carbonyl group occurs on the terminal carbon of the olefin so that crotonate esters are normally produced. In addition, a substantial amount of simple carbonylation of the olefin occurs, resulting in the formation of butyrate and isobutyrate esters. Similarly, when ethylene is reacted, some simple carbonylation to alkyl propionates occurs.

It is desirable to modify the aforementioned process to produce esters of methacrylic acid from propylene and to produce increased yields of acrylate esters from ethylene.

I have now found that the oxidative carbonylation reaction aforedescribed can be directed to secure the production of appreciable quantities of the esters of methacrylic acid or their addition product with an alcohol, esters of beta-acyloxy isobutyric acid.

The reaction can be modified to oxidatively carbonylate the internal carbon of propylene by incorporating, in the reaction zone, an organic compound containing an organic nitrogen oxide. Alkyl, cycloalkyl, aromatic and heterocyclic compounds bearing a nitrogen oxide are all operative, although the heterocyclic nitrogen oxides are preferred. Oxidative carbonylation of ethylene can also be favored over the simple carbonylation to achieve increased yields of acrylate rather than propionate esters. This cocatalyst can be incorporated in the alcoholic reaction medium or on the supported solid catalyst in quantities from about 0.01 to about 25; preferably from about 0.5 to about 10; and, more preferably, from about 2 to about 5 weight percent.

The reaction can be conducted under relatively mild conditions, e.g., 25° to about 300° C. and pressures from about atmospheric to 2,500 p.s.i.g. The reaction is preferably performed under liquid phase conditions and the reaction medium is preferably maintained anhydrous during the reaction.

The alcoholic reactant preferably is used in excess and serves as the reaction medium. Any alkyl, cycloalky, aryl, alkaryl or aralkyl monohydroxy alcohol having from about one to 20 carbons can be employed. Preferably, aliphatic alcohols having about one to six carbons are used such as methanol, ethanol, propanol, isopropanol, butanol, isobutanol, pentanol, isopentanol, hexanol, 2-ethylhexanol, heptanol, octanol, nonanol, decanol, phenylhexanol, tolyoctanol, napthylbutanol, dodecanol, pentadecanol, eicosanol, etc. Cyclic alcohols such as cyclohexanol, cyclopentanol, 2-ethyl cyclohexanol, etc., can be employed. Phenol, naphthol, ortho, meta or para cresol, cumenol, xylenol, etc., can also be employed if desired.

The alcohol is preferably used in excess and when liquid phase processing is employed, the alcohol can comprise the reaction medium. If desired, however, a liquid phase reaction medium can be provided with other organic solvents which are liquid at the reaction conditions and inert to the reactants and products. Such solvents include for example: various ethers such as methylethyl ether, diethyl ether, diisopropyl ether, dichloroethyl ether, ethylene glycol diisoamyl ether, ethylbenzyl ether, diethylene glycol diethyl ether, triethylene glycol diethyl ether, tetraethylene glycol dimethyl ether, etc.

Various esters can also be employed as the solvents such as methyl formate, ethyl formate, methyl acetate, ethyl acetate, n-propyl formate, isopropyl acetate, ethyl propionate, n-butyl formate, sec-butyl acetate, isobutyl acetate, ethyl n-butyrate, n-butyl acetate, isoamyl acetate, n-amyl acetate, glycol diformate, furfural acetate, isoamyl n-butyrate, ethyl acetylacetate, diethyl oxalate, glycol diacetate, isoamyl isovalerate, methyl benzoate, ethyl benzoate, methyl salicylate, n-propyl benzoate, n-dibutyl oxalate, etc.

Saturated hydrocarbons can also be used such as pentane, hexane, heptane, octane, decane, dodecane, mineral oils, etc.

The catalyst can also be employed in heterogeneous vapor phase catalysis by distending the noble metal catalyst on a suitable inert support. In general, any support or carrier which is a solid and inert to the reaction can be used such as titania, zirconia, alumina, silica, etc., or combination of these materials. Examples include alumina, silica stabilized alumina containing from 1 to 15 percent silica as described in U.S. Pat. No. 2,437,532, the aluminum silicates, clay, naturally occurring or synthetically prepared zeolites such as chabazite, gnelenite or faujasite, as well as synthetic zeolites. The latter materials are partially dehydrated crystalline compositions of silica and alumina and contain quantities of one or more exchangeable cations such as sodium, potassium, hydrogen, magnesium, calcium, etc. The compositions and their preparation are described in U.S. Pat. Nos. 2,882,243 and 2,882,244. These compositions are characterized by porous crystals of relatively uniform pore diameter between about five and 14 Angstrom units. Several crystal forms of such molecular sieves are available and suitable for use herein as the carrier for the dicarbollyl metal complexes of my invention including the "X," "Y," "L" and "J" crystal types. The sieves can be treated prior to deposition of the aforementioned catalytic metals by ion exchanging the monovalent alkali metal cation with a divalent metal. Also the sieves can be "decationized" by ion exchange with an ammonium salt followed by heating to decompose the zeolitic ammonium ion and leave a hydrogen ion. Any of the aforementioned carriers can be impregnated with appropriate aqueous solutions of the salts, chelates or complexes, aforementioned, of the noble metal catalyst and the nitrogen oxide cocatalyst with, as desired, the optional redox agents.

The catalyst particle size can vary over wide limits from about 0.5 inch to about 1 micron average diameter. The particle size selected depends on the type of solid-vapor contacting employed in the reaction zone. A disperse gas phase reaction would employ the very fine particles passing about a 325 mesh screen. Use of a fluidized bed reactor would require use of particles passing a 20 but retained on a 400 mesh screen. Packed bed reactors, which are preferred, would use the larger diameter particles having diameters from 0.05 to 0.5 inch, preferably from about 0.1 to 0.25 inch. The specific surface of the catalyst can also vary widely, from about 10 to 800 square meters per gram.

The platinum group metal component of the catalyst when distended on a solid carrier can be employed in an amount from about 0.01 to about 25 weight percent of the final catalyst. Preferably the noble metal is employed in a concentration from about 0.5 to about 10 weight percent based on the final catalyst. The noble metal can be distended on the carrier by impregnation of the carrier with a solution of a salt, complex or chelate of the noble metal. The impregnation can be achieved by evaporating the solvent from the admixture of inert carrier and catalyst solution or by addition of a precipitating agent to form an insoluble salt or hydroxide of the noble metal. The catalyst is thereafter dried and can be used in the oxidative carbonylation. The optional redox agent such as the salts of multivalent metals and/or the optional halide compound, can be similarly impregnated on the carrier in the amounts hereinafter mentioned.

The reaction is preformed at temperatures from about 25° to 300° C., preferably from about 100° to about 225° C. Vapor phase processing can be used, or the reaction pressure can be sufficient to maintain liquid phase conditions. Preferably, when a liquid phase is present, elevated pressures are used to increase the solubility of the gaseous reactants in the liquid phase, e.g., pressures from about 100 to about 2,500 p.s.i.g.; most preferably from about 500 to about 1,000 p.s.i.g. are employed. As previously mentioned, the reaction is performed by introducing the olefin and carbon monoxide into contact with the alcohol and the platinum group metal. In vapor phase processing, an anhydrous vapor mixture of the olefin, alcohol and carbon monoxide with or without an added gaseous diluent are passed over an inert solid which supports the platinum group catalyst and organic nitrogen oxide cocatalyst. In liquid phase processing, the olefin and carbon monoxide can be introduced into contact with an alcoholic solution of the catalyst with or without an added inert liquid diluent.

The platinum group metal can be of the platinum subgroup, i.e., platinum, rhodium or ruthenium or of the palladium subgroup, i.e., palladium, uranium or osmium. Palladium is preferred because of its demonstrated greater activity. In liquid phase processing, the platinum group metal can be employed in amounts between about 0.001 and 5.0 weight percent of the liquid reaction medium; preferably between about 0.04 and about 0.5 weight percent. With vapor phase processing, the platinum group metal can comprise from 0.01 to about 15, preferably from 0.5 to 5 weight percent of the solid catalyst. The platinum group metal can be dissolved in the reaction medium or distended on an inert solid support as a finely divided metal, as a soluble salt, complex or as a chelate. Examples of suitable salts are the halides, sulfates, nitrates and salts of the lower ($C_1$-$C_5$) carboxylates such as palladium chloride, rhodium acetate, ruthenium bromide, osmium oxide, iridium nitrate, palladium sulfate, platinum acetate, etc. Examples of suitable chelates are palladium acetylacetonate and complexes of the aforementioned platinum group metal ions with such conventional chelating agents as citric acid, ethylene diamine tetraacetic acid, and alkali metal salts thereof, e.g., sodium, potassium, tetraphenylcyclobutadiene, etc. Examples of suitable complexes include the complexes with $C_1$ to $C_5$ alkyl and $C_6$ to $C_8$ aryl phosphines, e.g., tris(triphenylphosphine)rhodium chloride, tris(tri-n-butyl)phosphine palladium nitrate, tris(triethylphosphine)osmium bromide, tris(tritolylphosphine)platinum chloride, etc. Other complexes with ligands such as cyano, e.g., barium tetracyanoplatinate, cyclodienes, e.g., bis(cyclopentadienyl)iridium chloride, bis(cyclopentadienyl)palladium, etc.

As previously mentioned, various oxidizing compounds can optionally be used to accelerate the rate of reaction. When oxygen is also introduced into contact with the catalyst, these compounds serve as redox agents. In general, any multivalent metal salt having an oxidation potential higher, i.e., more positive than the platinum metal, can be used. Typical of such are the salts of the multivalent metal ions such as the $C_1$ to $C_5$ fatty acid carboxylates, e.g., propionates, valerates, acetates, etc., nitrates; sulfates; halides, e.g., bromides, chlorides, etc., of copper, iron, manganese, cobalt, mercury, nickel, cerium, uranium, bismuth, tantalum, chromium, molybdenum or vanadium. Of these cupric and ferric salts are preferred and cupric salts are more preferred. Examples of the preferred cupric salts are cupric chloride, cupric bromide, cupric iodide, cupric fluoride, cupric nitrate, cupric sulfate, cupric acetate, cupric valerate, etc. The cupric salt can be employed in any desired amount, the higher concentrations being capable of effecting a higher conversion before requiring regeneration since a stoichiometric quantity of the cupric salt is reduced to a cuprous salt in the oxidation.

In liquid phase processing, the alcoholic reaction medium can contain from about 1 weight percent of a cupric salt up to and exceeding its saturation of the salt. In this fashion, the reaction medium can comprise a supersaturated slurry of the cupric salt. During the reaction, the soluble cupric salt is reduced to the cuprous and precipitates with fresh cupric salt dissolving until the entire inventory of the cupric salt has been reduced. In this fashion, slurries containing up to 80 weight percent of the cupric salt can be employed. This technique is desirable when employing separate regeneration of the cuprous salt so as to extend run lengths prior to the necessary regeneration. Preferably, the concentration of the cupric salt is from about 1 to about 35, and most preferably from 5 to about 15 weight percent. With vapor phase processing the concentration of the salt of the multivalent metal can be from 1 to about 35, preferably from 5 to about 15 weight percent of the solid catalyst.

Other oxidizing agents that can be dissolved in the reaction medium or distended on the inert solid support include ortho, meta and para quinones having from six to about 15 carbons, of one, two or three aromatic rings, e.g., benzoquinones, naphthaquinones, anthraquinones or phenanthraquinones. The aromatic rings can be substituted with various nonreactive groups such as halogens, or $C_1$ to $C_5$ alkyl groups, e.g., 1,2-benzoquinone, 2,6-dichlorobenzoquinone, 2,3,6-trichloro-1,4-benzoquinone, tetrachlorobenzoquinone, 3,5-dimethyl 1,2-benzoquinone, 6-chloronaphthaquinone, hexafluoronaphthaquinone, 7-amylnaphthaquinone, 1,6-naphthaquinone, tetrachloroanthraquinone, tetrachlorophenanthraquinone, etc.

To facilitate this oxidation and thereby increase the rate of reaction, I prefer to contact the reactants in the presence of between about 0.001 and 5.0 weight percent free or coordinately bonded halogen. Preferably, concentrations in the reaction zone are maintained between about 0.1 and 3.0 weight percent. This amount of halogen is preferably also in excess of the stoichiometric quantity necessary to form the halide of the most oxidized state of platinum group metal, e.g., in excess of 2 atomic weights of halogen per atomic weight of palladium present. In this manner, a rapid oxidation can be achieved. The halogen can be added as elemental chlorine or bromine or hydrogen chloride or bromide and can be added with the vapor mixture of reactants in vapor phase processing or can be dissolved in the reaction medium used in liquid phase processing. Less volatile halogen compounds such as alkali metal or ammonium halides, e.g., cesium chloride, potassium bromide, sodium bromate, lithium chloride, ammonium bromide, ammonium chloride, etc. can be dissolved in the reaction solvent or impregnated on the solid catalist. Also, any of the aforementioned platinum group metals can be added to supply a portion of the bromide or chloride and, when the hereafter mentioned multivalent metal redox salts are employed, these too can be added as the chloride or bromide.

The regeneration can be performed during the reaction by introduction of oxygen with the olefin and carbon monoxide or can be performed in a separate regeneration step. Water is formed by the oxygen regeneration and in vapor phase processing, the water vapor is swept out of the reaction zone with the products. In liquid phase processing with in situ regeneration some water accumulates in the reaction zone which is maintained substantially anhydrous, i.e., with no greater than about 5 weight percent water. The yield of unsaturated esters can be increased by simultaneously eliminating the water as it is formed and thereby preventing it from participating in the reaction.

The reaction medium can be maintained substantially anhydrous by evaporating some or all of the water formed during regeneration from the reaction medium. This can be achieved by stripping the water from the medium and removing it as a vapor effluent from the reaction zone or by withdrawing all or a portion of the reaction medium, evaporating the water and products therefrom and returning the regenerated medium to the reaction zone. Other methods of oxidation of the redox agent, however, can also be simultaneously performed with the reaction. To illustrate, a halogen can be used as the oxidizing agent such as chlorine, bromine, or fluorine, by simultaneously introducing the halogen into the reaction zone. Under the aforementioned reaction conditions the cuprous salt is oxidized by the halogen to the cupric halide.

If desired, a suitable dehydrating agent can be added to the reaction medium or to the reactant gas mixture to maintain the reaction under anhydrous conditions. With such dehydrating agents, it is possible to maintain entirely anhydrous conditions while providing in situ oxygen oxidation by introducing oxygen together with propylene and carbon monoxide into the reaction zone. Examples of suitable organic dehydrating agents which, for ease of handling, have from two to about 25 carbons are: alkyl and aryl isocyanates such as methyl isocyanate, benzene isocyanate, toluidene diisocyanate, amyl isocyanate, benzene isocyanate, toluidene diisocyanate, amyl isocyanate, isooctyl isocyanate, etc., N,N'-alkyl and aryl substituted carbodiimides such as N,N'-dimethyl carbodiimide, N,N'-diethyl carbodiimide, N,N'-diisopropyl carbodiimide, N,N'-dibutyl carbodiimide, N-amyl, N'-methyl carbodiimide, N,N'-dicyclohexyl carbodiimide, N,N'-diphenyl carbodiimide, N,N'-dibenzyl carbodiimide, etc., alkyl acetals and ketals such as 1,1-diethoxyethane, 1,1-dibutoxyethane, 2,2-dimethoxypropane, 2,2-diethoxybutane, 3,3-diisopropoxypropane, 3,3-dipentoxyhexane, 1,1-dimethoxycyclohexane, etc., alkyl orthoesters such as ethyl orthoformate, methyl orthoformate, butyl orthoacetate, ethyl orthoacetate, etc.

As previously mentioned, the oxidation of the reduced catalyst can be effected in a step separate from the reaction step where propylene and carbon monoxide are contacted with the solution. In this operation, oxygen or an oxygen-containing oxidizing compound can be employed to regenerate the catalyst. A suitable regeneration comprises introducing a stream of oxygen or mixture of oxygen and an inert gas, e.g., nitrogen, air, etc., into contact with the catalyst solution or the solid catalyst which has been reduced from previous contacting with propylene and carbon monoxide. Temperatures from about 20° to about 250° C. are sufficient for this operation and the pressures employed are sufficient to maintain the alcoholic reaction medium in that phase, e.g., atmospheric to about 2,000 p.s.i.g.

Because the oxygen oxidation of the solution forms water, it is preferred to dehydrate the solution used in liquid phase processing before again contacting it with propylene and carbon monoxide. Preferably, the water is vaporized from the reaction medium and this vaporization can be facilitated by stripping the reaction medium within an inert gas such as combustion gases, nitrogen, etc., or by continuing to introduce oxygen or air into the solution after oxidation has been effected to strip the water from the solution. Preferably, to facilitate removal of the water, the pressure can be subatmospheric, atmospheric or slightly elevated above atmospheric, e.g., from about 20 millimeters mercury to about 10 atmospheres. All or a portion of the water can also be removed by the addition of sufficient quantities of any of the aforementioned dehydrating agents. Most of the water is expelled from the solid catalyst during regeneration; however, some inert supports form hydrates and preferably are dried by heating the catalyst, in the presence of a dry gas, to about 95° to 225° C. for several minutes to several hours.

When the alcoholic reactant is more volatile than water, it is apparent that the volatilization of water from the reaction solvent will also remove any excess alcoholic reactant. Accordingly, it is preferred when employing such alcoholic reactants in the oxygen regeneration scheme to employ a second reaction medium which is less volatile than water. This medium will retain the catalyst salts in solution. The alcoholic reactant vaporized from the medium in the water removal step is returned to the reaction medium during the reaction. Any of the aforementioned solvents having a lesser volatility than water can be employed for this purpose or, if desired, any of the aforementioned alcoholic reactants higher boiling than water can be employed.

As previously mentioned, the reactions forms an ester of an unsaturated acid or beta-alkoxy-saturated acid, or a dicarboxylic acid. When operating in a continuous fashion in liquid phase, a portion of the liquid reactants can be continuously removed from the reaction zone and the ester of the unsaturated acid purified therefrom. In vapor phase processing, the vapor effluent is condensed and the desired products are separated from the condensate. A suitable separation step comprises, e.g., azeotropic distillation of the liquid to remove the ester and alcoholic reactant from any excess alcohol which can be returned to the reaction zone. When the particular alcohol and ester do not form an azeotrope, any other known azeotroping agent can be added to obtain the ester in the volatile fraction from the crude product.

Relative rates of the carbon monoxide based on the olefin can be from 1:10 to 10:1 molecular units per molecular unit of olefin, preferably rates from about 1:1 to about 5:1 and most preferably from 1:1 to 2:1 molecular ratios are employed.

To permit a continuous reaction when using a separate regeneration step, a portion of the catalyst salts can also be withdrawn, preferably in admixture with the liquid product and, after recovery of the ester product, the catalyst is regenerated by any of the aforementioned separate regeneration schemes. The regeneration solution can then be recycled to the oxidation zone. In vapor phase processing, two or more reactors each containing a bed of catalyst can be used in parallel, alternating between regeneration and reaction steps.

Various mechanical designs of the reaction zone can be employed. Two or more vessels can be employed while alternating or switching of the reaction and regeneration between vessels or by circulating the solid catalyst or the catalyst solution between vessels so that a continuous production of the ester can be achieved. Alternatively, a single vessel can be used and the reactants and oxygen regenerant can simultaneously be introduced into this vessel. Such vessels can be equipped with a cooling means to maintain the reaction temperature and, with liquid phase processing, a stirrer to insure adequate contacting of the gas and liquid within the reaction zone.

As previously mentioned, the cocatalyst used in accordance with my invention is an alkyl, cycloalkyl, aryl or heterocyclic compound having from one to about 15 carbons and containing a nitrogen oxide as a nitro or nitroso group. Examples of suitable nitrogen oxide compounds are various nitrated aromatics and heterocyclics having from five to about 12 carbons, e.g., nitrobenzene, nitropyridine, 1-nitronaphthalene, 3-nitroindole, 1-nitroindene, p-nitrotoluene, nitroxylene, 4-nitrotriazole, 3-nitropyrole, nitropseudocumene, p-nitroethylbenzene, o-nitrocumene, 3,5-dinitrocumene, p-dinitrobenzene, 2,6-dinitronaphthalene, 1-nitro-2,6-dimethylnaphthalene, nitroanthracene, nitrophenanthracene, etc. The various heterocyclic compounds containing a hetero nitrogen atom bearing an oxo atom include the various nitrogen oxide compounds such as pyridine oxide, pyrrol oxide, isopyrrol oxide, triazole oxide, pyridazine oxide, pyrimidine oxide, pyrozine oxide, triazine oxide, astriazine oxide, b-diazine oxide, 2-isobenzazole oxide, pyrindine oxide, quinoline oxide, indol oxide, isoquinoline oxide, naphthyridine oxide, pyridol pyridine oxide, pyridol pyridine dioxide, etc.

Examples of other cocatalysts that can be used include the nitroso aromatics and heterocyclics such as nitrosobenzene, 4-nitrosopyridine, 3-nitrosopyrrol, 4-nitrosoisopyrrole, 4-nitroso-5-triazine, 7-nitrosoindole, 6-nitrosoquinazoline, 1-nitroso-2-napthol, p-nitrosophenyl, o-nitrosotoluene, p-nitrosocumene, nitrosoaniline, nitrosopseudocumene, nitrosoxylene, nitrosonaphthaiene, nitrosoanthracene, etc.

Alkyl and cycloalkyl nitro compounds that are useful include nitromethane, nitroethane, nitropropane, 2-nitropropane, nitrobutane, 2-nitro-2-ethylhexane, nitrooctane, nitrodecane, nitrododecane, nitropentadecane, nitrocyclohexane, 3-nitromethylcyclopentane, nitrocyclobutane, nitrocycloheptane, nitrocyclooctane, etc. Nitroso alkyl compounds can also be used. These are oxides of alkyl amines having fully substituted carbons that bear the nitroso group. These have the structure:

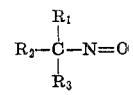

wherein: $R_2$ and $R_3$ are alkyl, cycloalkyl or aryl; and $R_1$ is halogen or alkyl. Examples of suitable nitrosoalkyls are: 2-nitroso-2-methylpropane, 2-nitroso-2-chloropropane, 2-nitroso-2-bromobutane, 3-nitroso-3-methylhexane, 2-nitroso-2,2-diphenylethane, 2-nitroso-2-cyclohexylpropane, tri-n-butylnitrosomethane, etc.

While not wishing to be bound by any unproven theory regarding the functioning of the cocatalyst, I believe that the cocatalyst functions as a steric or orienting ligand on the palladous catalyst and orients the olefin to direct substitution onto the internal carbon. An aromatic or heterocyclic ring can enhance the ligand strength of the oxygen atom of the nitrogen oxide by the electron withdrawing or delocalizing properties and, accordingly, these are preferred ligands. The complexing between the cocatalyst and the noble metal catalyst can thereby effect the steric blocking of the Group VIII noble metal sufficiently to direct the oxidative carbonylation onto the secondary carbon of the olefin.

The aforementioned cocatalyst is incorporated in the reaction medium simply by the addition of the necessary amount of the cocatalyst to provide the aforeindicated concentrations of this material in the reaction medium or on the inert solid. When volatile cocatalysts are used such as the lower molecular weight ($C_1$-$C_7$) nitroalkanes, these cocatalysts can be maintained in the reaction zone by their addition to the reactants continuously or intermittently to provide the necessary concentration of the nitroalkane in the reaction zone. The cocatalyst is soluble in the alcoholic reaction mediums employed.

A mode of practice of the invention will now be illustrated by the following examples:

EXAMPLE 1

A 1-gallon, Teflon-lined autoclave is charged with 0.5 gram palladous chloride, 2.5 grams cupric chloride, 5.0 grams 1-nitronaphthalene, 300 grams methanol and 106 grams propylene. The autoclave is closed and pressured to 600 p.s.i.g. with carbon monoxide and then heated to 300° F. Oxygen is then introduced in about 10 p.s.i.g. increments while the temperature is maintained at 300° F. The reaction is performed for 20 minutes and the autoclave is then cooled, depressured, opened and the reaction medium filtered and analyzed by gas chromatography to reveal the following yields of esters from the propylene reactant:

| Compound | Weight Yield (Grams) |
| --- | --- |
| Methyl methacrylate | 1.5 |
| Methyl butyrate | 7.3 |
| Methyl crotonate | 11.3 |
| Higher boiling esters | 4.7 |

The high boiling ester fraction contains some dimethylpyrotartrate. Some acetone and dimethyl carbonate is also produced.

The reaction is repeated using 2.5 grams of cupric bromide in place of the cupric chloride previously employed. The yield of ester products resulting from the oxidation of propylene are as follows:

| Compound | Weight Yield (Grams) |
| --- | --- |
| Methyl methacrylate | 1.0 |
| Methyl crotonate | 4.3 |
| Methyl butyrate | 7.4 |
| Higher boiling esters | 1.8 |

When the reaction is repeated in the absence of the nitronaphthalene, no methyl methacrylate is detectable in the product.

EXAMPLE 2

The autoclave is charged with 0.5 gram palladous chloride, 2.5 grams cupric nitrate, 5 grams pyridine 1-oxide, 300 grams methanol and 110 grams propylene. The autoclave is closed, pressured to 600 p.s.i.g. with carbon monoxide and then heated to 300° F. Oxygen is slowly introduced in about 10 p.s.i. increments over a reaction period of 15 minutes. The autoclave is then cooled, depressured and opened and the liquid product is filtered and analyzed by gas chromatography to reveal the following yield of ester products from propylene:

| Compound | Weight Yield (Grams) |
| --- | --- |
| Methyl methacrylate | 2.1 |
| Methyl crotonate | 0.3 |
| Methyl butyrate | 1.1 |
| Higher boiling esters | 11.1 |

The high boiling ester fraction contains some dimethyl pyrotartrate and some acetone and dimethyl carbonate is also produced.

EXAMPLE 3

The autoclave is charged with propylene and a reaction medium comprising 2.5 grams cupric acetate, 5.0 grams pyridine 1-oxide, 101 grams methanol, 200 grams dimethyl sulfoxide and 0.5 gram palladous chloride. The autoclave is closed and pressured to 600 p.s.i.g. with carbon monoxide and then heated to 300° F. Oxygen is then slowly introduced in about 10 p.s.i. increments over a reaction period of 15 minutes. Upon completion of the reaction period, the autoclave is cooled, depressured and opened, and the liquid contents are filtered and analyzed by gas chromatography. The following yield of products is obtained:

| Compound | Weight Yield (Grams) |
| --- | --- |
| Methyl methacrylate | 2.6 |
| Methyl crotonate | 1.1 |

Some amounts of dimethyl pyrotartrate, acetone and dimethyl carbonate are also produced.

When the experiment is repeated with substitution of ethylene for the propylene, e.g., by pressuring the autoclave to 300 p.s.i.g. with ethylene, then to 600 p.s.i.g. with carbon monoxide, the oxidative carbonylation yields ethyl acrylate, ethyl β-ethoxy propionate and diethyl succinate. Some simple carbonylation to ethylpropionate also occurs but at a reduced rate than occurs when the experiment is repeated in the absence of the pyridine-1-oxide.

EXAMPLE 4

The effect of various nitroalkanes on the distribution of oxidatively carbonylated products is investigated. In a series of experiments an autoclave is charged with 300 milliliters methanol, 100 grams propylene, 0.5 gram palladium chloride, 2.5 grams each of cupric and cuprous chlorides and the particular nitroalkane under investigation at a concentration of 0.25 molar, from 6.2 to 7.3 grams. The autoclave is closed, pressured to 600 p.s.i.g. with carbon monoxide and heated to 300° F. Oxygen and nitrogen are then added in increments of about 10–20 p.s.i. over a 10–15 minute period. The liquid product is analyzed by gas chromatography to determine the relative amounts of methyl methacrylate and methyl crotonate esters. Some amounts of methyl n-butyrate, methyl-iso-butyrate and dimethyl succinate are also produced. The following table summarizes the results:

| Nitroalkane | (methacrylate) Ratio(crotonate) |
| --- | --- |
| None | 0.06 |
| Ethyl nitrate | 0.22 |
| Propyl nitrate | 0.13 |

Similar results are obtained when equivalent amounts of nitroso alkyl compounds are used such as when 9 grams of 2-nitroso-2-chloropropane are used in lieu of the 6 grams ethyl nitrate.

EXAMPLE 5

The invention is applied to vapor phase processing by impregnating 137.3 grams silica pellets, 3/16-inch long by 3/16-inch diameter, with an aqueous solution of 10 grams palladium chloride, 10 grams cupric chloride and 16 milliliters concentrated hydrochloric acid dissolved in 34 milliliters water. The pellets are dried under vacuum for 4 hours at 100° C., then impregnated with 10 grams 1-nitronaphthalene in 57 milliliters benzene and dried under vacuum for one hour at 80° C. The catalyst pellets are packed into a U-shaped glass tube fitted with gas introduction and withdrawal tubes at opposite ends and the tube is immersed in a heating bath be construed o-dichlorobenzene. A vapor mixture of equal volumes each of air, propylene, methanol and carbon monoxide is passed through the glass tube while the heating bath is maintained at 180° C. The vapor effluent is passed through several flasks of acetic acid to trap the products. Methylmethacrylate and methylcrotonate are produced by the reaction and the yield of methylmethacrylate relative to methylcrotonate is increased with the catalyst containing the nitronaphthaline over that obtained with a similar catalyst that does not contain the nitronaphthalene.

The preceding examples are intended solely to illustrate a mode of practice of the invention and to demonstrate results obtainable thereby. It is not intended that the examples be construed as limiting of the invention which is defined by the steps and reagents and their obvious equivalents set forth in the following claims:

I claim:

1. The oxidative carbonylation of an olefin selected from the class consisting of propylene and ethylene which comprises contacting at a temperature from about 25° to about 300° C. and a pressure from atmospheric to about 2,500 p.s.i.g, said olefin with carbon monoxide in the presence of a monohydroxy alcohol having from one to about 20 carbons, a catalytic amount of a platinum group metal in an elevated oxidation state and a cocatalyst selected from the class consisting of aromatic, saturated aliphatic and alicyclic and heterocyclic nitro and nitroso compounds having from one to about 15 carbons, to replace a hydrogen on an unsaturated carbon of said olefin with an alkoxycarbonyl group.

2. The oxidative carbonylation of claim 1 wherein said olefin is propylene.

3. The oxidative carbonylation of claim 1 wherein said olefin is ethylene.

4. The oxidative carbonylation of claim 1 wherein said catalyst also contains a redox agent selected from the class consisting of salts of multivalent metals and $C_1$–$C_5$ alkyl and halo substituted quinones having from six to about 15 carbons.

5. The oxidative carbonylation of claim 1 wherein said cocatalyst is a heterocyclic nitrogen oxide.

6. The oxidative carbonylation of claim 5 wherein said cocatalyst is pyridine oxide.

7. The oxidative carbonylation of claim 1 wherein said cocatalyst is a nitroaromatic.

8. The oxidative carbonylation of claim 7 wherein said cocatalyst is nitronaphthalene.

9. The oxidative carbonylation of claim 1 wherein said olefin and carbon monoxide are contacted with a liquid reaction medium containing said alcohol, catalyst and cocatalyst.

10. The oxidative carbonylation of claim 1 wherein oxygen is also contacted with said platinum group metal to maintain said metal at said elevated oxidation state.

11. The oxidative carbonylation of an olefin selected from the class consisting of propylene and ethylene which comprises contacting said olefin, oxygen, carbon monoxide and a monohydroxy alcohol having from one to about 20 carbons in the presence of a catalyst comprising a Group VIII noble metal in an elevated oxidation state, a redox agent comprising a multivalent metal salt having an oxidation potential more positive than said Group VIII noble metal and from 0.01 to 25 weight percent of a cocatalyst selected from the class consisting of aromatic, saturated aliphatic and alicyclic and heterocyclic nitro and nitroso compounds having from one to about 15 carbons, at conditions comprising a temperature from about 25° to about 300° C. and a pressure from atmospheric at about 2,500 p.s.i.g., sufficient to replace a hydrogen on an unsaturated carbon of said olefin with an alkoxycarbonyl group.

* * * * *